United States Patent
Bel Calavia et al.

(10) Patent No.: US 12,277,354 B2
(45) Date of Patent: *Apr. 15, 2025

(54) PRINTING ERROR DETECTION

(71) Applicant: Hewlett-Packard Development Company, L.P., Spring, TX (US)

(72) Inventors: Josep Maria Bel Calavia, Sant Cugat del Valles (ES); Antonio Gracia Verdugo, Sant Cugat del Valles (ES); Andrei Alexandru Dafinoiu, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 129 days.

This patent is subject to a terminal disclaimer.

(21) Appl. No.: 18/185,819

(22) Filed: Mar. 17, 2023

(65) Prior Publication Data
US 2023/0214160 A1 Jul. 6, 2023

Related U.S. Application Data

(63) Continuation of application No. 17/417,256, filed as application No. PCT/US2019/026919 on Apr. 11, 2019, now Pat. No. 11,635,924.

(51) Int. Cl.
*B41J 11/00* (2006.01)
*B41J 19/20* (2006.01)
(Continued)

(52) U.S. Cl.
CPC .......... *G06F 3/1221* (2013.01); *B41J 11/006* (2013.01); *B41J 11/0095* (2013.01);
(Continued)

(58) Field of Classification Search
CPC ....... G06F 3/1221; B41J 11/006; B41J 23/32; B41J 29/26; B41J 11/0095; B41J 19/205
See application file for complete search history.

(56) References Cited

U.S. PATENT DOCUMENTS

| 7,731,319 B2 | 6/2010 | Murcia et al. |
| 7,924,477 B1 | 4/2011 | Malzbender et al. |

(Continued)

FOREIGN PATENT DOCUMENTS

| JP | 2012-187879 A | 10/2012 | |
| JP | 2015218057 A | * 12/2015 | ............... B65H 7/02 |
| JP | 2018-030296 A | 3/2018 | |

*Primary Examiner* — Yaovi M Ameh
(74) *Attorney, Agent, or Firm* — Jordan IP Law, LLC (57) ABSTRACT

In example implementations, a method, a device, and a program are provided. The method includes detecting a power increase movement of a printer carriage. A location of the printer carriage is detected at a time of the detected power increase. Based on the detected location of the printer carriage, determine whether the print medium is damaged. The device includes a power monitor to detect a power increase during movement of a printer carriage. A locator detects a location of the printer carriage at the time of the detected power increase. A damage determiner determines, based on the detected location of the printer carriage, whether the print medium is damaged. The program detects a power increase during movement of a printer carriage. Location of printer carriage is detected at time of detected power increase. Based on detected location of the printer carriage, it is determined whether the print medium is damaged.

15 Claims, 6 Drawing Sheets

(51) Int. Cl.
*B41J 23/32* (2006.01)
*B41J 29/26* (2006.01)
*G06F 3/12* (2006.01)

(52) U.S. Cl.
CPC ............ *B41J 19/205* (2013.01); *B41J 23/32* (2013.01); *B41J 29/26* (2013.01)

(56) References Cited

U.S. PATENT DOCUMENTS

| | | |
|---|---|---|
| 8,783,859 B2 | 7/2014 | Tokisawa et al. |
| 10,110,757 B2 | 10/2018 | Eiyama et al. |
| 11,635,924 B2 * | 4/2023 | Bel Calavia .......... G06F 3/1221 358/437 |
| 2007/0188578 A1 | 8/2007 | Kayanaka |
| 2009/0237744 A1 | 9/2009 | Ogura et al. |
| 2011/0302401 A1 | 12/2011 | Yokoyama et al. |
| 2013/0002743 A1 | 1/2013 | Masunaga |
| 2014/0139848 A1 | 5/2014 | Kanzawa et al. |
| 2017/0225494 A1 | 8/2017 | Tokunaga et al. |
| 2018/0022116 A1 | 1/2018 | Flotats et al. |
| 2018/0072077 A1 * | 3/2018 | Iioka ...................... B41J 19/202 |
| 2018/0257898 A1 | 9/2018 | Arredondo et al. |

\* cited by examiner

PRINTING ERROR DETECTION

CROSS-REFERENCE TO RELATED APPLICATIONS

The present application is a continuation of U.S. patent application Ser. No. 17/417,256 (filed on Jun. 22, 2021), which is a National Stage Entry of PCT/US2019/026919 (filed Apr. 11, 2019), all of which are hereby incorporated by reference in their entirety.

BACKGROUND

Many printers deposit print material on a print medium. Printing may be carried out by passing the print medium along a printing path. A printer carriage may be passed over the print medium at a print location along a scan axis. The scan axis may be perpendicular to the direction of movement of the print medium along the printing path. Print media may be made of materials such as paper, Mylar, vinyl and textiles, for example. Print media may have different thicknesses.

BRIEF DESCRIPTION OF DRAWINGS

Examples will now be described, by way of non-limiting example, with reference to the accompanying drawings, in which.

DETAILED DESCRIPTION

Print media used in various forms of printing, for example, dye sublimation printing, may vary in thickness. A trend recently is towards using print media of lower grammage (grams per square metre). These thinner print media may offer lower costs per copy and may allow for longer uninterrupted printing. As print media becomes thinner tendencies towards wrinkling and ink-media interactions including paper expansion may become more common, both of which may lead to contact between the print medium and the printer carriage. Such contact may be described as a "crash", for example. In some examples the print media may be so thin that a printer may continue to print even when a print media is damaged. This may lead to print material waste, printer damage, or further subsequent damage to the print medium.

In some examples, there is provided a method of detecting variations in the power used to move a printer carriage, during printing, when compared with expected power usage values. The variations may then be linked to the location of the printer carriage and, if the printer carriage is outside a predefined print zone at the time of the variation, the variation may be deemed not to be the result of damage to the print medium. If the printer carriage is inside the predefined print zone at the time of the variation, the variation may be deemed to indicate damage to the print medium. This method may help to eliminate false positives when other power usage variations are detected, such as during acceleration of the printer carriage.

Figure 1:
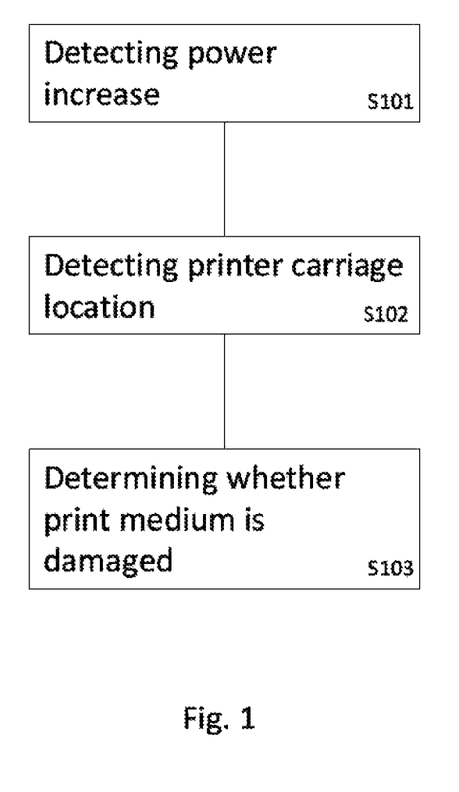
FIG. 1 is a flowchart of an example of a method of determining whether print medium is damaged in accordance with some examples.

In some examples, as shown in FIG. 1, a method is provided comprising detecting S101 a power increase. A power increase (such as a "spike" or "jump" in power usage) may occur when power usage increases by at least a threshold amount over an expected power usage during movement of a printer carriage over a print medium along a scan axis. The method may further comprise detecting S102 a location of the printer carriage at a time of the detected power usage increase. The method may further comprise determining S103, based on the detected location of the printer carriage, whether the print medium is damaged.

During a print movement (for example the movement of a printer carriage from one side of the print medium to the other, sometimes referred to as a swath) the power used to move the printer carriage may be continuously monitored. An expected power usage for a movement of the printer carriage may be predetermined. This may be described as a power usage profile over time for a printer carriage movement. A power increase occurs when the difference between the actual power used and the expected power usage differ by at least a threshold amount.

A power increase may also be described as a power variation or difference, as it is an indicator which relates to the expected power usage. An expected power usage may for example be based on the actual measured power usage of the last print movement, or based on calculated power usage for a given print movement.

The power used to move the printer carriage may be proportionate to the resistance to movement result from many factors including the weight of the printer carriage, friction between the moving components of the printer, and, in the event of contact between the printer carriage and the print medium, the resultant additional resistance. In some examples, at the end of each print swath the power used to move the carriage along the scan axis is evaluated. If a peak is detected when the carriage is passing over the substrate edges it may be inferred that a crash has occurred. If this peak is maintained or increases during the print swath then it may be likely that a tear has occurred, and part of the substrate is being moved by the carriage.

In some examples the power usage is monitored during movement of the printer carriage and linked to the position of the printer carriage during the movement. Carrying out the continuous monitoring of the power usage and linking this to the position of the printer carriage on the scan axis may allow for a more accurate profiling of the power usage and movement of the printer carriage for each printing pass (swath). In some examples the location of the printer carriage may be determined at the time that a power increase is detected.

In some examples the method may further comprise, when the position of the printer carriage corresponds to an edge of a print zone at the time of the detected power usage increase, determining that the print medium is damaged. The print zone may for example correspond to the area covered by the print medium and edges of the print zone correspond to the sides of the print medium. Contact between the printer carriage and the print medium may be more likely to first occur at the edges of the print medium, particularly when the print medium does not lie flat over the surface beneath. Damage to the print medium may therefore be likely to begin when the printer carriage passes thereover. Consequently, a power usage variation, or increase, which occurs when the printer carriage is at or near the edge of the print medium may be indicative of a crash and therefore damage to the print medium.

A position corresponding to an edge of the print zone may be at or sufficiently near the edge of the print medium to indicate such a crash. For example, print medium may move slightly when first coming into contact with the printer carriage, before being folded, creased or ripped, such that the power usage increase is caused. Therefore, the power usage increase may be detected at or slightly after the printer carriage passes over the position of the edge of the print medium.

Figure 2:
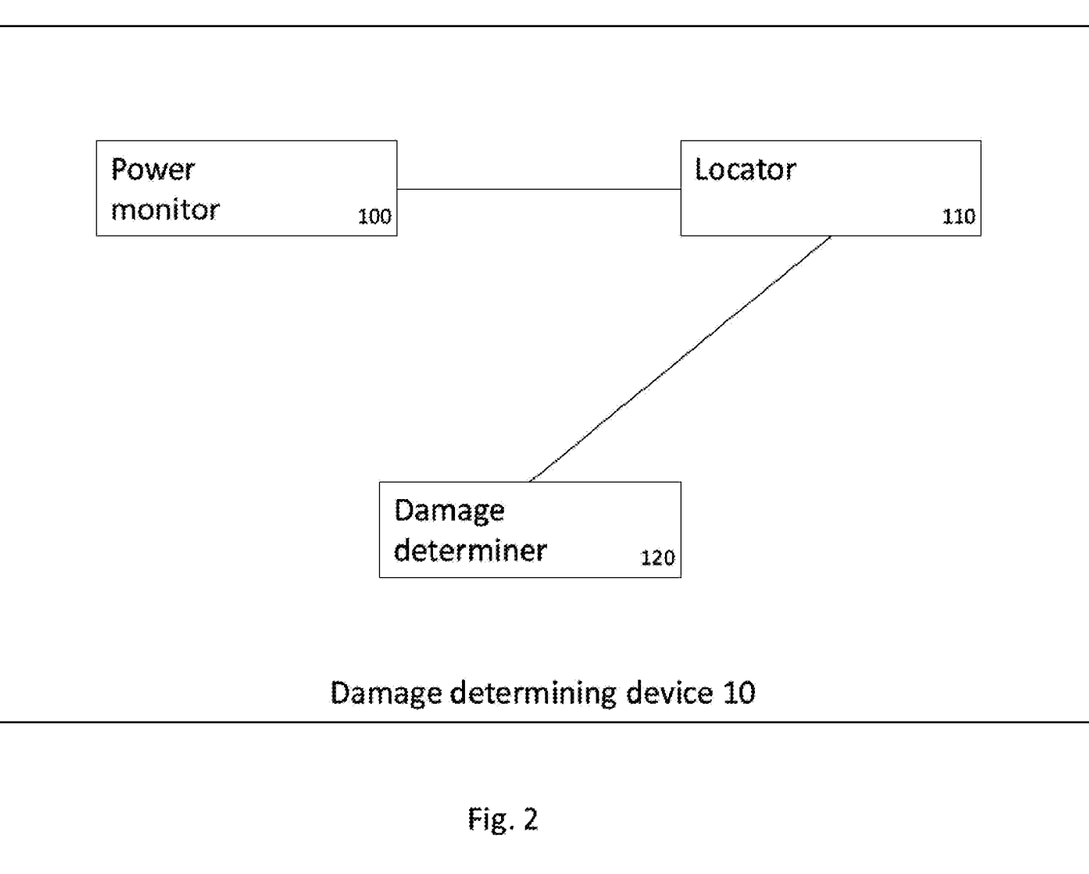
FIG. 2 is a simplified schematic of an example of an apparatus for determining whether a print medium is damaged in accordance with some examples.

In some examples, as shown in FIG. 2, there is provided a device, for example a damage determining device 10, comprising a power monitor 100 to detect a power increase, during which power usage increases by at least a threshold amount over an expected power usage during movement of a printer carriage over a print medium along a scan axis. The damage determining device 10 may be included as part of a printer carriage or maybe a separate device to the printer carriage. The power monitor 100 may further continuously monitor the power usage associated with moving the printer carriage over the print medium along a scan axis during printing.

The device may further comprise a locator 110 to detect a location of the printer carriage at the time of the detected power increase. The device may further comprise a damage determiner 120 to determine, based on the detected location of the printer carriage, whether the print medium is damaged. The damage determiner 120 may determine that, if the detected location is within the print zone, it is likely that the print medium is damaged. If the detected location is outside the print zone however the damage determiner 120 may determine that the print medium is not damaged. If a power increase as described above occurs within the print zone, it may be likely that this is due to a collision of the printer carriage with the print medium. If however a power increase as described above occurs outside the print zone it is possible that the power increase may relate to acceleration of the printer carriage and, more significantly, with no print medium outside the print zone it is less likely that this has resulted in damage to the print medium.

In some examples the device may further include an optical sensor 130, such as a camera or other visual inspection device, to inspect the print medium for damage. The optical sensor may be located on the printer carriage to allow visual inspection of the print medium during a subsequent print pass. The optical sensor 130 may be used to confirm damage detection, in which case the printer may perform a scan using the optical sensor 130, which may be embedded in the carriage, on the following pass. If substrate is found during the scan, then, its start and end positions (on this scan axis) may be compared to expected positions or positions scanned previously during media loading, to determine the presence of a tear. In the case that no tear is found printing may continue normally with minimal throughput loss since only one extra pass to carry out the visual inspection may be used.

Figure 3:
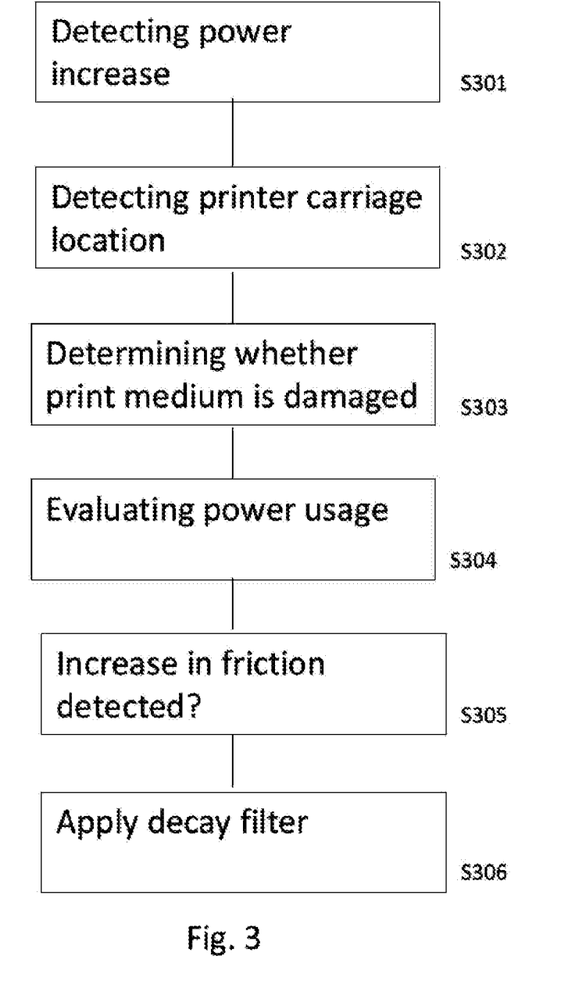
FIG. 3 is a flowchart of a further example for method of determining whether print medium is damaged in accordance with some examples.

In some examples, as shown in FIG. 3, the method (wherein S101 to S103 in FIG. 1 correspond to S301 to S303 in FIG. 3) may further comprise, at the end of each print carriage movement, evaluating S304 the power usage over the printer carriage movement. In some examples the evaluation may be carried out if no power increase is detected and may not be carried out if a power increase is detected. In the event no power increase (power variation) is detected, the evaluated power usage may be used as the expected power usage for the following print movement or other subsequent print movements.

Further in some examples the method may further comprise, based on the power usage evaluation, determining S305 whether an increase in friction is detected during printer carriage movement. Incremental small increases in friction associated with movement of the printer carriage may occur due to standard usage of the printer.

To reduce or eliminate the influence of the friction increase it may be possible to iteratively update the expected power usage values to take the corresponding power usage increase, due to the additional friction, into account. Taking these into account, it may be possible to calibrate the expected power values more accurately for each movement of the printer carriage. Following detection of damage to the print medium, a visual inspection may be carried out to establish the extent of the damage.

In some examples, the method may further comprise applying a decay filter S306 to the expected power usage to adjust the threshold power usage increase amount. With each print movement, it may be possible to assess an appropriate threshold, for the change in the power usage relative to the expected power usage, to detect increases indicative of contact between the printer carriage and the print medium. A decay filter, used to adjust the threshold, may be applied using the following equations.

$$\text{Power}_{Average}(t+1) = \text{Power}_{Average}(t) \cdot \alpha + \text{Power}_{Movement}(t) \cdot (1-\alpha)$$

$$\text{Threshold}(t+1) = \text{Power}_{Average}(t+1) + \text{PeakDetectionMargin}$$

After every pass, the power used to move the carriage along the scan axis may be evaluated. If a threshold power increase is detected during a pass, the printing may be stopped and the damage evaluation process may be started. If during the pass the power increase does not reach, the expected power for the following movement may be updated based on the above equations.

The decay filter may eliminate power variations which do not exceed a threshold amount. The threshold may be set according to the second equation above. As shown, the threshold may be set based on current expected power along with a margin for error to avoid false positives.

The expected power may change over the life of the printer, due for example to an incremental increase in friction over time as a result of scan axis degradation. Therefore, the expected power may be updated after every pass, or every pass where the threshold power variation is not exceeded.

The expected power may be updated using the decay filter, wherein a weight ($\alpha$) may be given to the current expectation and another to the last measurement ($1-\alpha$). This may smooth the evolution of the update and help account for small incremental increases in power usage. $\alpha$ may always be between 0 and 1. The closer the weight $\alpha$ is to 1, the lower the impact of the current measurement may be on the expectation.

This update pass after pass may allow for a reduction in the PeakDetectionMargin, which in turn may increase the accuracy of the variation detection and thus damage detection, particularly in the case of a thin print medium.

In some examples, according to the equations above, in the event a power increase beyond the threshold is detected, α may be set to 1 so that the measured power does not affect the expected power value (first equation). In this case it is determined that damage to the print medium has occurred and therefore these power measurements would be abnormal, such that they should not be included in the normal expected power estimation.

Conversely, in some examples, when no power increase beyond the threshold is detected, α may be set to 0 or 0.5, for example, so that the subsequent expected power is either based entirely on the previous pass or partly takes the previous pass into account, when determining the expected power.

Figure 4:
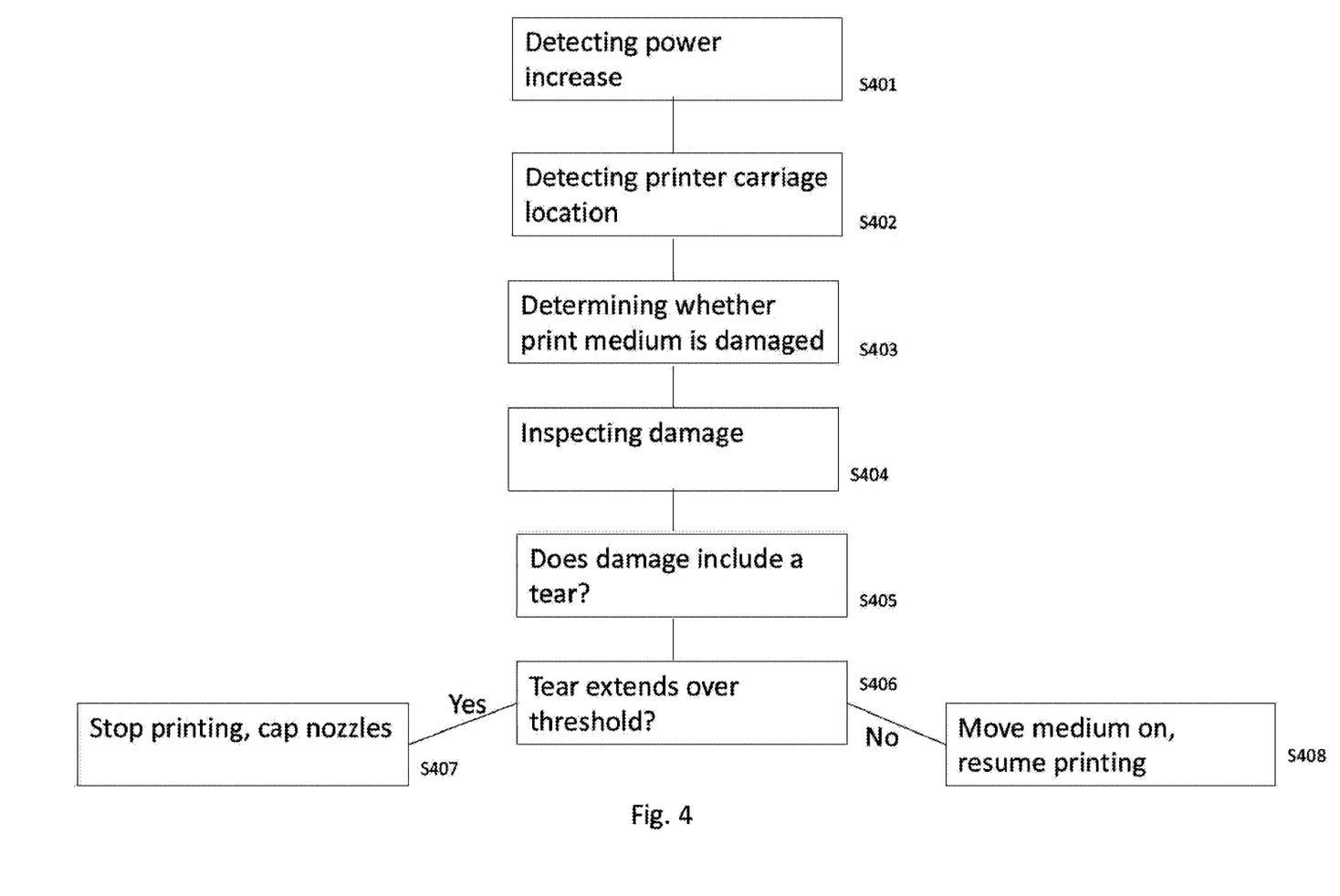
FIG. 4 is a flowchart of a further example of a method of determining whether a print medium is damaged in accordance with some examples.

In some examples as shown in FIG. 4, (with S401 to S403 of FIG. 4 corresponding to S101 and S103 of FIG. 1) the method may further comprise, when the determining indicates that the print medium is damaged, inspecting S404 the damage with an optical sensor 130 on a next print movement. In some examples, the next print movement is the next print swath. For example, if it is determined the print medium is damaged on a first movement from one side of the print medium to the other, the next print movement may be from the other side of the print medium back to the one side.

An optical sensor 130 may be passed over the print medium to identify any damage. Based on the inspection carried out by the optical sensor 130, a damage report, which may include information such as a type of damage (e.g. a fold, wrinkle or tear) and an indication of damage severity (e.g. a size of the tear), may be sent to the damage determiner 120a, which may carry out corrective measures, such as moving the print medium forward along the print path or stopping printing altogether.

In some examples inspecting the damage comprises comparing the location of the sides of the print medium with predetermined locations of the edges of the print zone. The print medium may be guided by guides along the print path which may be used to determine the intended location of the print medium which may be compared with the actual location of the sides of the print medium upon visual inspection.

In some examples the method may further comprise, when the determining indicates that the print medium is damaged, determining S405 whether the damage includes a tear. Some print media may be more inclined to tear and others to wrinkle or fold. It may be determined whether a tear has occurred based on the inspection by the optical sensor 130 or by the characteristic of the detected power increase and subsequent power usage profile. For example, a small tear may be characterised by a short power usage increase, indicative of the amount of time the printer carriage remains in contact with the print medium, whereas a larger tear may be characterised by a longer power usage increase, which may remain elevated as the print medium is dragged with the printer carriage.

In some examples the method may further comprise, when the damage includes a tear, determining S406 whether the tear extends over a threshold amount (e.g. width) of the print medium. If the tear extends over the threshold amount of the print medium S407, stopping printing and capping the printer nozzles. If the tear does not extend over the threshold amount S408, moving the print medium forward by a predetermined amount along the print path and resuming printing.

The threshold tear amount may be determined based on the material used as a print medium and the thickness of the material. For example, some materials have a relatively strong resistance to tearing, even when already torn, such as textiles, in which case the threshold amount may be relatively large. Other materials, such as thin paper, may offer lower resistance to further tearing when already torn and therefore the threshold amount will be correspondingly lower.

In one example, print medium comprising paper of 18 gsm may be used and an appropriate tear amount threshold may be approximately 30% of the print medium width. Thus, if a tear is identified however it is less than 30% of substrate width, then the print medium may be advanced by a set amount. An optical scan may be performed (again) at this stage to confirm no tear is present, and printing may continue. This corrective action may be useful for example where printing includes continuous printing of small, repeated patterns/images along an entire length of print medium, where the impact of a blank (non-printed) space, due to moving the print medium on, is less significant. If a tear is over 30% of the width, in this example, then it may be determined, based on the medium type, thickness and tendency to tear further, that moving the print medium on may simply tear it further, and printing may therefore be paused for user intervention.

Figure 5:
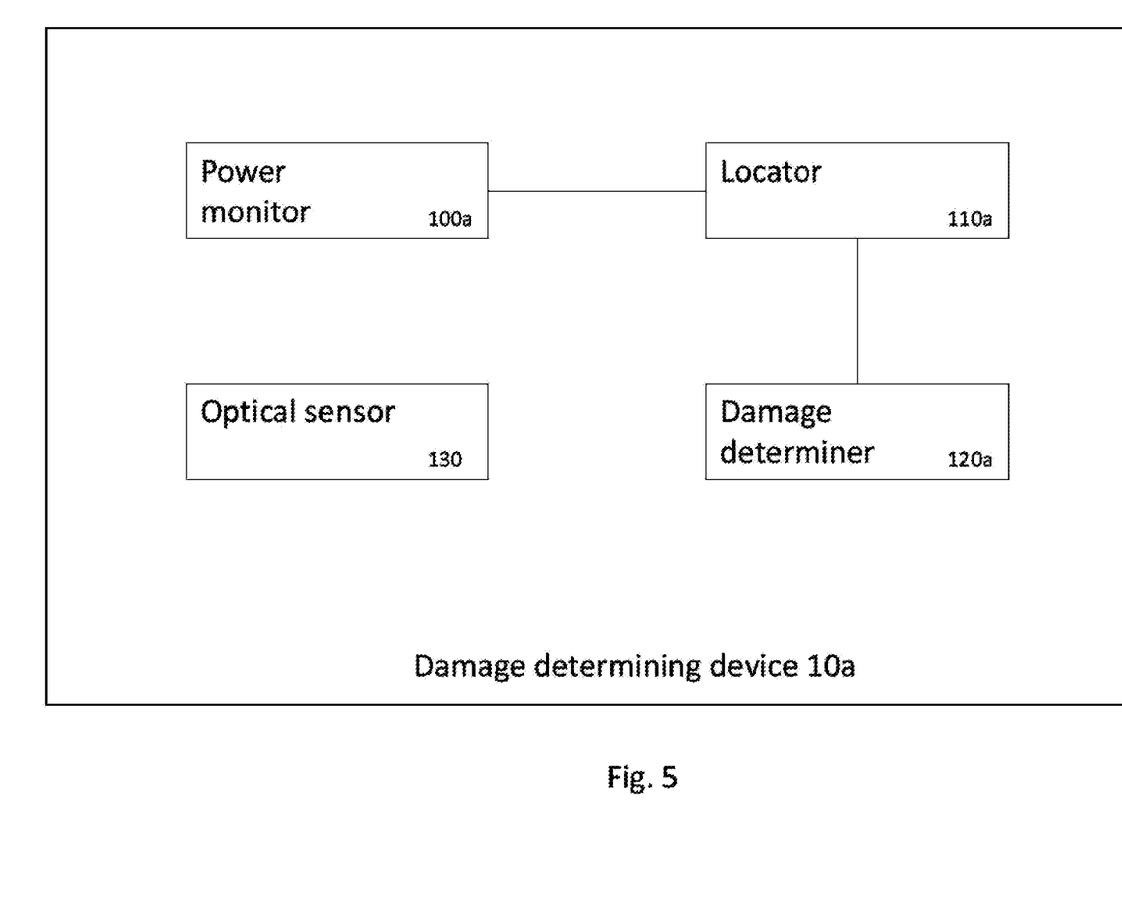
FIG. 5 is a simplified schematic of a further example of an apparatus for determining whether a print medium is damaged in accordance with some examples.

In some examples, as shown in FIG. 5, there is provided a device, for example a damage determining device 10a, comprising a power monitor 100a, such as a power meter, to monitor a power increase, during which power usage increases by at least a threshold amount over an expected power usage during movement of a printer carriage over a print medium along a scan axis. The damage determining device 10a may be included as part of a printer carriage or maybe a separate device to the printer carriage. The device may further comprise a locator 110a to detect a location of the printer carriage at the time of the detected power increase. The device may further comprise a damage determiner 120a to determine, based on the detected location of the printer carriage, whether the print medium is damaged. The device may further comprise an optical sensor 130, to carry out a visual inspection of the print medium, when the damage determiner 120a determines that the print medium is damaged.

Figure 6A:
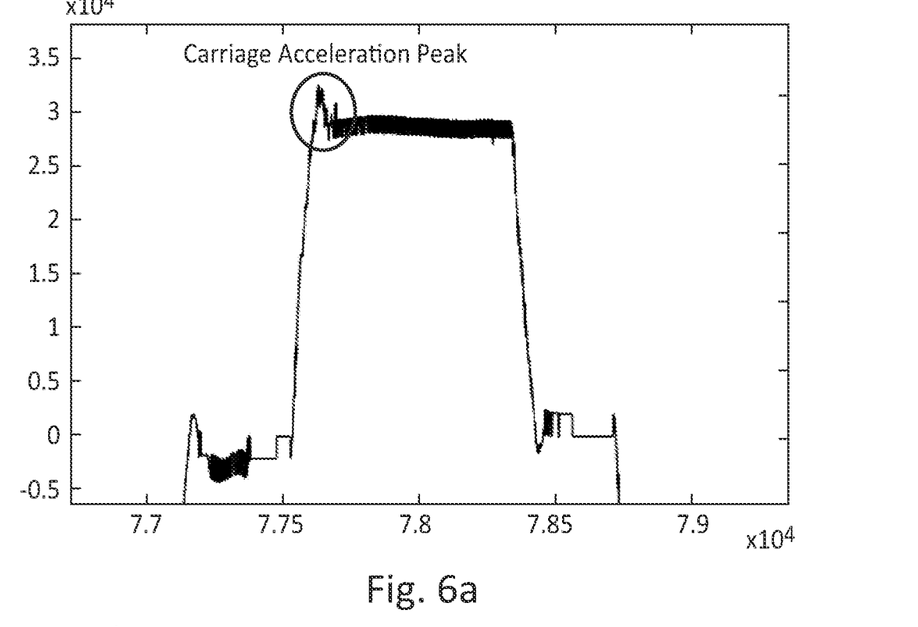
FIGS. 6a and 6b are graphs showing how a usage readings relating to normal printing and when damage has occurred, respectively.
Figure 6B:
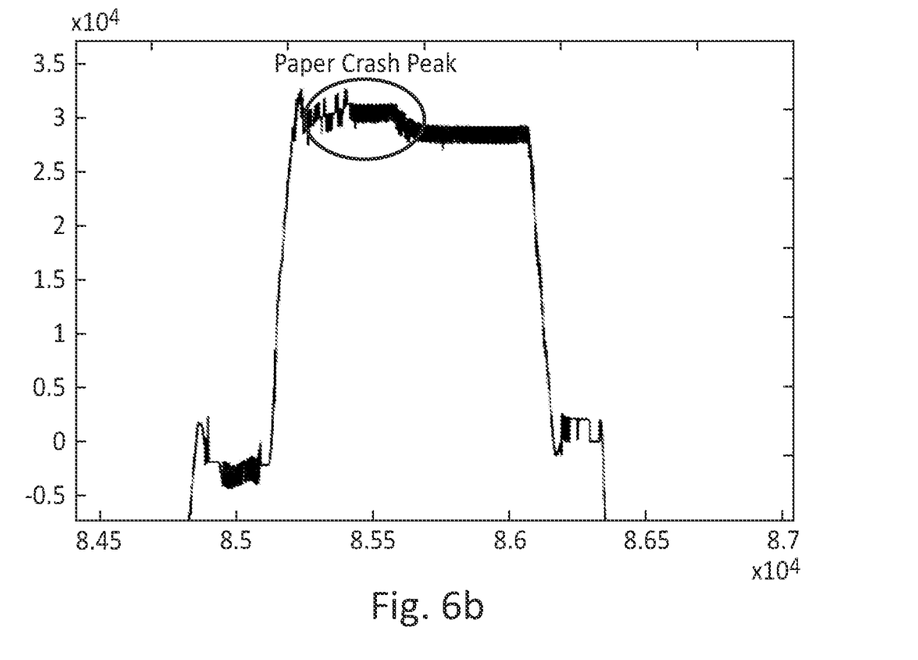

In some examples as shown in FIGS. 6a and 6b the power usage profile during normal printing, shown in FIG. 6a, may include various power usage spikes or peaks. However, this power usage profile during normal printing may be compared with the power usage profile when the printer carriage contacts the printing medium which may produce the power usage profile as shown in FIG. 6b. The variation between the two profiles may be used to determine whether the print medium has been damaged or not.

Taking the examples shown in FIGS. 6a and 6b, in FIG. 6a, during a regular movement, a deviation of +−1% around the mean may be observed. In FIG. 6b, the peak caused by a crash is 7% over the mean. Therefore, a threshold of 4%, for example, would be appropriate to detect it the crash while avoiding false positives.

In many print processes printing is ideally carried out in a continuous manner without interruption. However as print materials become thinner (have a lower gram per square metre value) possible disruptions due to print medium folding, wrinkling or tearing become more likely. In accordance with some examples, downtime and wasted print material or damage print medium can be minimalised by the above described methods and devices.

In some examples, there is provided a program which, when executed on a computer, causes the computer to carry out a process comprising: detecting a power increase, during which power usage increases by at least a threshold amount over an expected power usage during movement of a printer carriage over a print medium along a scan axis. The process may further comprise detecting a location of the printer carriage at the time of the detected power increase and determining, based on the detected location of the printer carriage, whether the print medium is damaged. In some examples, at the end of each printer carriage movement, the power usage over the printer carriage movement is evaluated.

According to the above examples, ink waste and printer damage may be minimised, by identifying print medium damage during printing. Further waste may be reduced by carrying out the appropriate remedial action. Printer downtime may be reduced in cases where the remedial action may be carried out automatically in response to a determination that print medium damage has occurred.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   detecting a power increase during movement of a printer carriage;
   detecting a location of the printer carriage at a time of the detected power increase; and
   determining, based on the detected location of the printer carriage, whether the print medium is damaged.

2. The method according to claim 1, wherein the power usage is monitored during movement of the printer carriage and linked to the position of the printer carriage during the movement.

3. The method according to claim 2, further comprising, when the position of the printer carriage corresponds to an edge of a print zone at the time of the detected power usage increase, determining that the print medium is damaged.

4. The method according to claim 1, further comprising, at the end of each printer carriage movement, evaluating the power usage over the printer carriage movement.

5. The method according to claim 4, further comprising, based on the power usage evaluation, determining whether an increase in friction is detected during printer carriage movement.

6. The method according to claim 1, further comprising applying a decay filter to the expected power usage to adjust the threshold power usage increase amount.

7. The method according to claim 1, further comprising, when the determining indicates that the print medium is damaged, inspecting the damage with an optical sensor on a next print movement.

8. The method according to claim 7, wherein inspecting the damage comprises comparing the location of sides of the print medium with predetermined locations of sides of a print zone.

9. The method according to claim 1, further comprising, when the determining indicates that the print medium is damaged, determining whether the damage includes a tear.

10. The method according to claim 9, further comprising, when the damage includes a tear, if the tear extends over a threshold width of the print medium, stopping printing and capping printer nozzles.

11. The method according to claim 9, further comprising, when the damage includes a tear, if the tear does not extend over the threshold amount, moving the print medium by a predetermined amount along the print path and resuming printing.

12. A device comprising:
- a power monitor to detect a power increase during movement of a printer carriage;
- a locator to detect a location of the printer carriage at the time of the detected power increase; and
- a damage determiner to determine, based on the detected location of the printer carriage, whether the print medium is damaged.

13. The device according to claim 12, further comprising: an optical sensor to inspect print medium damage.

14. A non-transitory computer readable storage medium having a program which, when executed on a computer, causes the computer to carry out a process comprising:
- detecting a power increase during movement of a printer carriage;
- detecting a location of the printer carriage at the time of the detected power increase; and
- determining, based on the detected location of the printer carriage, whether the print medium is damaged.

15. The non-transitory computer readable storage medium according to claim 14, wherein, at the end of each printer carriage movement, the power usage over the printer carriage movement is evaluated.

\* \* \* \* \*